(12) United States Patent
Tanioka

(10) Patent No.: US 6,619,421 B2
(45) Date of Patent: Sep. 16, 2003

(54) ELECTRIC POWER STEERING DEVICE

(75) Inventor: Yasuhiro Tanioka, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/935,225

(22) Filed: Aug. 22, 2001

(65) Prior Publication Data

US 2002/0029923 A1 Mar. 14, 2002

(30) Foreign Application Priority Data

Sep. 8, 2000 (JP) ........................................ 2000-273296

(51) Int. Cl.$^7$ ................................................. B62D 5/04
(52) U.S. Cl. ..................................................... 180/444
(58) Field of Search ................................. 180/443, 444

(56) References Cited

U.S. PATENT DOCUMENTS 6,129,171 A * 10/2000 Takaoka ..................... 180/444
6,467,567 B2 * 10/2002 Kobayashi et al. ......... 180/444
6,470,993 B1 * 10/2002 Matsuda et al. ............ 180/444

* cited by examiner

Primary Examiner—Kevin Hurley
(74) Attorney, Agent, or Firm—Jordan and Hamburg LLP

(57) ABSTRACT

In an electric power steering device, an actuator generates steering assistance power in response to torque transmitted by a steering shaft, the outer circumference of which is covered by a torque sensor detecting the torque. The rotation of the actuator is transmitted to the steering shaft by a reduction gear mechanism having a driven gear on the steering shaft, and a driving gear which engages with the driven gear. The torque sensor is disposed between the driven gear and the steering wheel. A housing has a portion which covers the steering shaft between the steering wheel and the torque sensor, and a portion which covers the torque sensor. The housing is formed by plastically deforming a single metal pipe.

9 Claims, 8 Drawing Sheets

ELECTRIC POWER STEERING DEVICE

FIELD OF THE INVENTION

The present invention relates to an electric power steering device that detects steering torque transmitted by a steering shaft by means of a torque sensor, and provides steering assistance power in response to the torque detected by means of an electric actuator.

DESCRIPTION OF THE RELATED ART

Prior art electric power steering devices comprise a steering shaft which rotates by operation of a steering wheel, a torque sensor which is disposed around the circumference of the steering shaft and detects torque transmitted by means of the steering shaft, an electric actuator which generates steering assistance power in response to the torque detected, and a reduction gear mechanism which transmits the rotation of the actuator to the steering shaft. The reduction gear mechanism includes a driven gear arranged on the steering shaft and a driving gear that engages with the driven gear, and the torque sensor is disposed between the steering wheel and the driven gear.

Prior art electric power steering devices are further equipped with a column which covers a portion of the steering shaft between the steering wheel and the torque sensor, a sensor housing which covers the torque sensor, a gear housing which covers the reduction gear mechanism, and an end cover covering a portion of the steering shaft, which is further away than the driven gear from the steering wheel. The column is press fitted into an aperture formed in the sensor housing. The sensor housing, gear housing, and end cover are formed from cast aluminum in order to lightening the weight thereof. The gear housing is connected to the sensor housing with bolts on the side thereof which is away from the steering wheel. The end cover is connected to the gear housing with bolts on the side thereof which is away from the steering wheel.

The problems with the above prior art steering device are that there are a large number of parts, the manufacturing process needed to press fit the column into the sensor housing is complicated, and size of the device is enlarged due to the increase in the thickness of the walls of the sensor housing in which the column is press fitted. Furthermore, when the sensor housing, gear housing, and end cover are connected together with bolts, there are a large number of parts involved and the manufacturing process is complicated, because it requires parts such as bolts, the tapping, and the tightening of the bolts. In addition, when the sensor housing, gear housing, and end cover are formed from cast aluminum, there is a large amount of post-machining needed after casting because they greatly exceed their dimensional tolerances. Furthermore, bolts and the like are needed in order to fix a connection brackets to the vehicle body.

The object of the present invention is to provide an electric power steering device that can solve the aforementioned problems.

SUMMARY OF THE INVENTION

The present invention is an electric power steering device comprising a steering shaft which rotates by operation of a steering wheel; a torque sensor which detects torque transmitted by the steering shaft; an electric actuator for generating steering assistance power, which is driven in response to the torque detected; a reduction gear mechanism which transmits the rotation of the actuator to said steering shaft. The reducing gear mechanism has a driven gear provided on the steering shaft and a driving gear which engages with the driven gear. The torque sensor is disposed between the steering wheel and the driven gear. The electric power steering device further comprises a housing having a portion which covers the steering shaft between the steering wheel and the torque sensor, and a portion which covers the torque sensor. The housing is formed by plastically deforming a single metal pipe. The pipe is preferably, for example, a steel pipe.

According to the present invention, since the housing formed by plastically deforming a single metal pipe covers not only the steering shaft but also the torque sensor, the number of parts of the steering device can be reduced, the manufacturing process can be simplified because it is unnecessary to press fit a column into the sensor housing as with the prior art, the size of the device can be reduced and space can be saved because the walls of the housing do not have to be thickened for press fitting. Furthermore, since the housing is formed by plastically deforming a single metal pipe, the dimensional tolerances can be reduced as compared to casting, so that the amount of post-machining needed after the plastic deformation can be reduced. For example, the post-machining is needed only to the portions in which bearings are fit.

The present invention preferably comprises a gear housing which covers the driving gear and the driven gear, and is formed integrally with one end of the housing, the one end of which is further away than the other end from the steering wheel; and an end cover which covers a portion of the steering shaft, the portion of which is further away than the driven gear from the steering wheel, and the end cover is formed integrally with one end of the gear housing, the one end of which is further away than the other end from the steering wheel.

In order to further reduce the number of parts and further simplify the manufacturing process, it is preferred that the driven gear is covered with the housing, and a second housing is provided so that it covers a portion of the steering shaft, the portion of which is further away than the driven gear from the steering wheel, and also covers the driven gear, and the second housing is integrated with one end of the housing, the one end of which is further away than the other end from the steering wheel.

In the present invention, it is preferred that the inner diameter of the housing at one end, which is further away than the other end from the steering wheel, is larger than at the other end, the steering shaft is supported by the housing via bearings, and the bearings, the steering shaft united with the driven gear, and the torque sensor are inserted into the housing from one end of thereof, which is further away than the other end from the steering wheel.

In this manner, the assembling of the bearings, driven gear, steering shaft, and torque sensor into the housing can be performed from one end of the housing, the one end of which is further away than the other end from the steering wheel. In other words, because the assembling steps can be performed from one side of the housing, working efficiency can be increased.

In the present invention, it is preferable that a metal connecting member is attached to the vehicle body and welded to the housing. It is preferable that the metal connecting member is formed from, for example, steel.

In this manner, the number of parts can be reduced and the manufacturing process can be simplified, because bolts and the like are not needed to fix the connecting member to the housing.

The electric power steering device according to the present invention can provide a reduction in the number of parts, simplification in the manufacturing process, improving of working efficiency during assembly, and can save space.

DESCRIPTION OF THE PREFERRED EMBODIMENT

Figure 1:
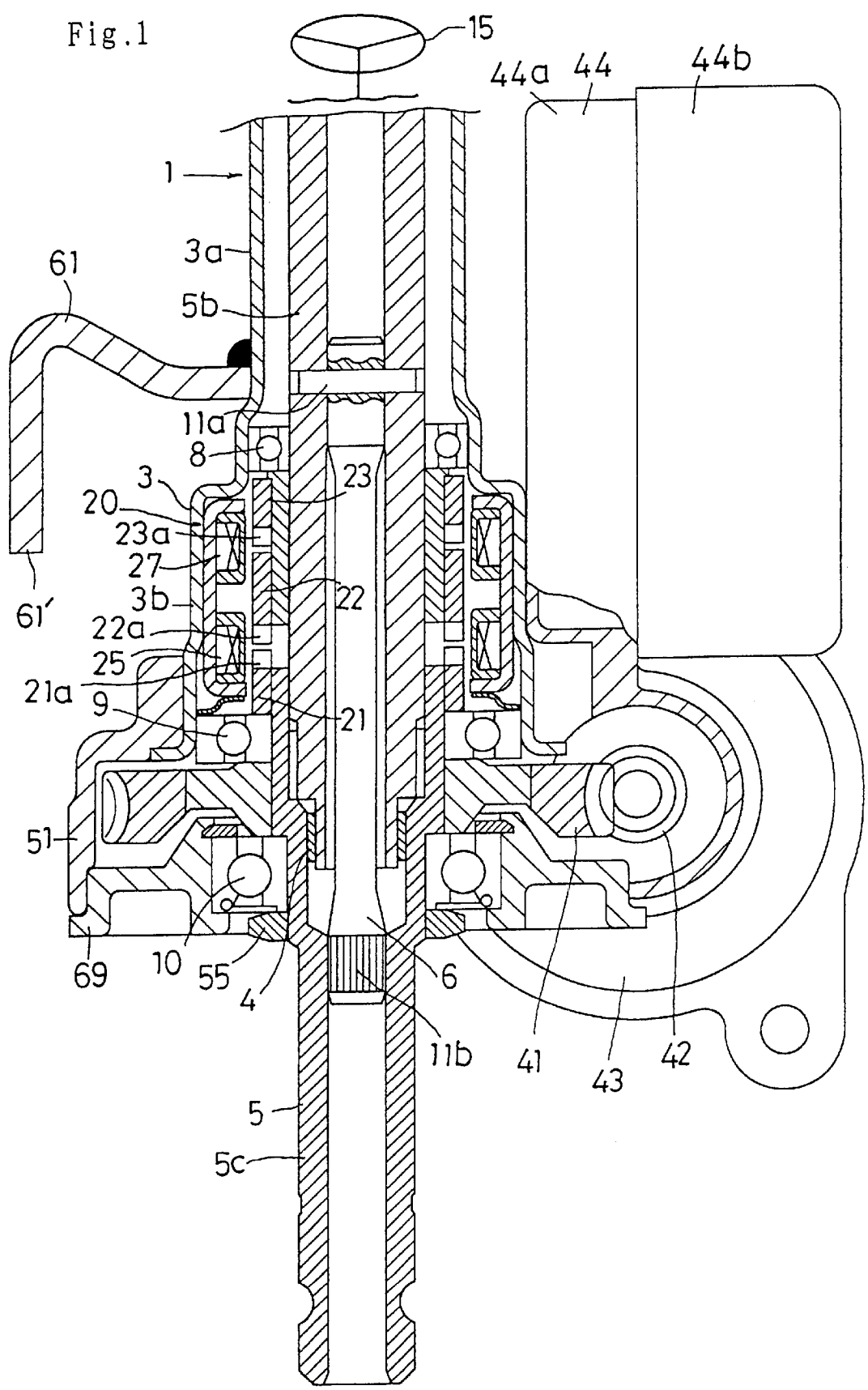
FIG. 1 is a vertical cross-sectional view of the essential elements of an electric power steering device according to a first embodiment of the present invention.

A shock absorbing type electric power steering device 1 of a first embodiment shown in FIGS. 1 to 6 comprises a tubular column 2, a housing 3, and a steering shaft 5 inserted into the column 2 and housing 3. The housing 3 has a tubular portion 3a closest to a steering wheel 15. The tubular portion 3a is fitted into the column 2. The center axis of the column 2 and tubular portion 3a is arranged on the vehicle body (omitted from the figures) such that it extends downwards to the front portion of the vehicle body.

The tubular portion 3a is fitted into the column 2 such that relative displacement occurs in the axial direction with respect to the column 2 in response to an impact caused by collision between the driver of the vehicle and the steering wheel 15. The energy of impact is absorbed by the relative displacement in the axial direction between the tubular portion 3a and column 2 against mutual friction. In the present embodiment, a portion of the circumference of the column 2 is rendered a caulking portion 2a, so that a frictional force which inhibits the relative displacement in the axial direction is produced by pressing this caulking portion 2a against the outer circumference of the tubular portion 3a.

The steering wheel 15 is connected to one end (the upper end in FIGS. 4 and 5) of the steering shaft 5, and the other end of the steering shaft 5 (the lower end in FIGS. 1 and 2) is connected to vehicle wheels via a rack and pinion type steering gear or the like (omitted from the figures). The steering shaft 5 rotates by operation of the steering wheel 15, and this rotation is transmitted to the vehicle wheels via the steering gear so that the steering angle changes.

The steering shaft 5 is divided into a tubular first shaft 5a, a second shaft 5b engaged with the first shaft 5a so as to be unrotatable relative thereto, and a third shaft 5c engaged with the second shaft 5b via a bushing 4. By making the inner circumference of the first shaft 5a and the outer circumference of the second shaft 5b non-circular, for example, both shafts 5a and 5b are incapable of relative rotation around an axis but capable of relative displacement in the axial direction. A torsion bar 6 is inserted into the second shaft 5b and third shaft 5c. One end of the torsion bar 6 is attached to the second shaft 5b via a pin 11a, and the other end of the torsion bar 6 is attached to the third shaft 5c via serrations 11b. Thus, both shafts 5b and 5c are able to rotate elastically relative to each other around an axis.

The first shaft 5a is supported by the column 2 via a bearing 7, the second shaft 5b is supported by the housing 3 via a bearing 8, and the third shaft 5c is supported by the housing 3 via a bearing 9 and also supported by an end cover 69 (discussed below) via a bearing 10. The first shaft 5a, column 2 and bearing 7 are connected such that they are capable of moving together in the axial direction when an impact is applied. Thus, upon impact, the column 2 is displaced in the axial direction relative to the tubular portion 3a, and the first shaft 5a is displaced in the axial direction relative to the second shaft 5b. The tubular portion 3a and column 2 are displaced to each other in the axial direction against mutual friction, and the energy of impact is absorbed thereby.

As shown in FIG. 1, a torque sensor 20 detecting torque transmitted by the steering shaft 5 is disposed around the outer circumference of the steering shaft 5. The torque sensor 20 is covered by a portion 3b of the housing 3, the portion 3b of which is further away than the portion 3a from the steering wheel 15.

Figure 6:
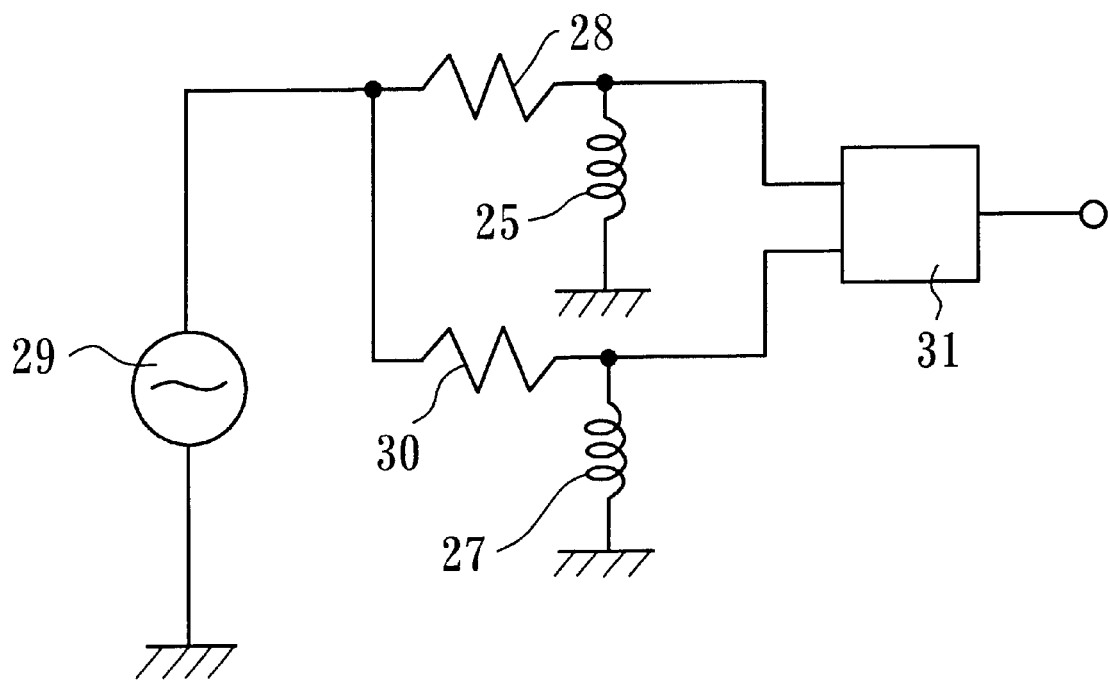
FIG. 6 is a circuit diagram of the torque sensor of the electric power steering device according to the first embodiment of the present invention.

The torque sensor 20 comprises a first detection ring 21 made from a magnetic material and fixed to the outer circumference of the third shaft 5c, a second detection ring 22 and a third detection ring 23 respectively made from a magnetic material and fixed to the outer circumference of the second shaft 5b, and a first detection coil 25 and a second detection coil 27 respectively supported by the housing 3. One end portion of the first detection ring 21 and one end portion of the second detection ring 22 are covered by the first detection coil 25, and a plurality of teeth 21a and 22a are formed along the circumferential direction on each of the end portions. The other end portion of the second detection ring 22 and one end portion of the third detection ring 23 are covered by the second detection coil 27, and a plurality of teeth 23a are formed along the circumferential direction on the one end portion of the third detection ring 23. The other end portion of the second detection ring 22 is flat and there are no teeth formed thereon. The area, where the teeth 21a on the first detection ring 21 face to the teeth 22a on the second detection ring 22, changes in accordance with the relative rotation of the detection rings 21 and 22, due to twisting of the torsion bar 6 based on the transmission of the torque via the steering shaft 5. Due to this change, the magnetic resistance to the magnetic flux generated by the first detection coil 25 changes in the space between the teeth 21a and the teeth 22a. Since the output of the first detection coil 25 changes in response to this change, the torque corresponding to the output can be detected. The area, where the other end portion of the second detection ring 22 face to the teeth 23a on the third detection ring 23, is fixed, so that the change in the magnetic resistance to the magnetic flux generated by the second detection coil 27 is not effected by steering resistance. The fluctuation in output from the first detection coil 25 and the fluctuation in output from the second detection coil 27 caused by fluctuation in temperature are equivalent to each other. As shown in FIG. 6, the first detection coil 25 is connected to an oscillator 29 via a resistor 28, and the second detection coil 27 is connected to the oscillator 29 via a resistor 30. Each of the coils 25 and 27 is connected to a differential amplification circuit 31, and the value of output from the differential amplification circuit 31 corresponds to the torque detected by the torque sensor 20. The fluctuation in output from the torque sensor 20 due to fluctuation in temperature is thus compensated.

Figure 2:
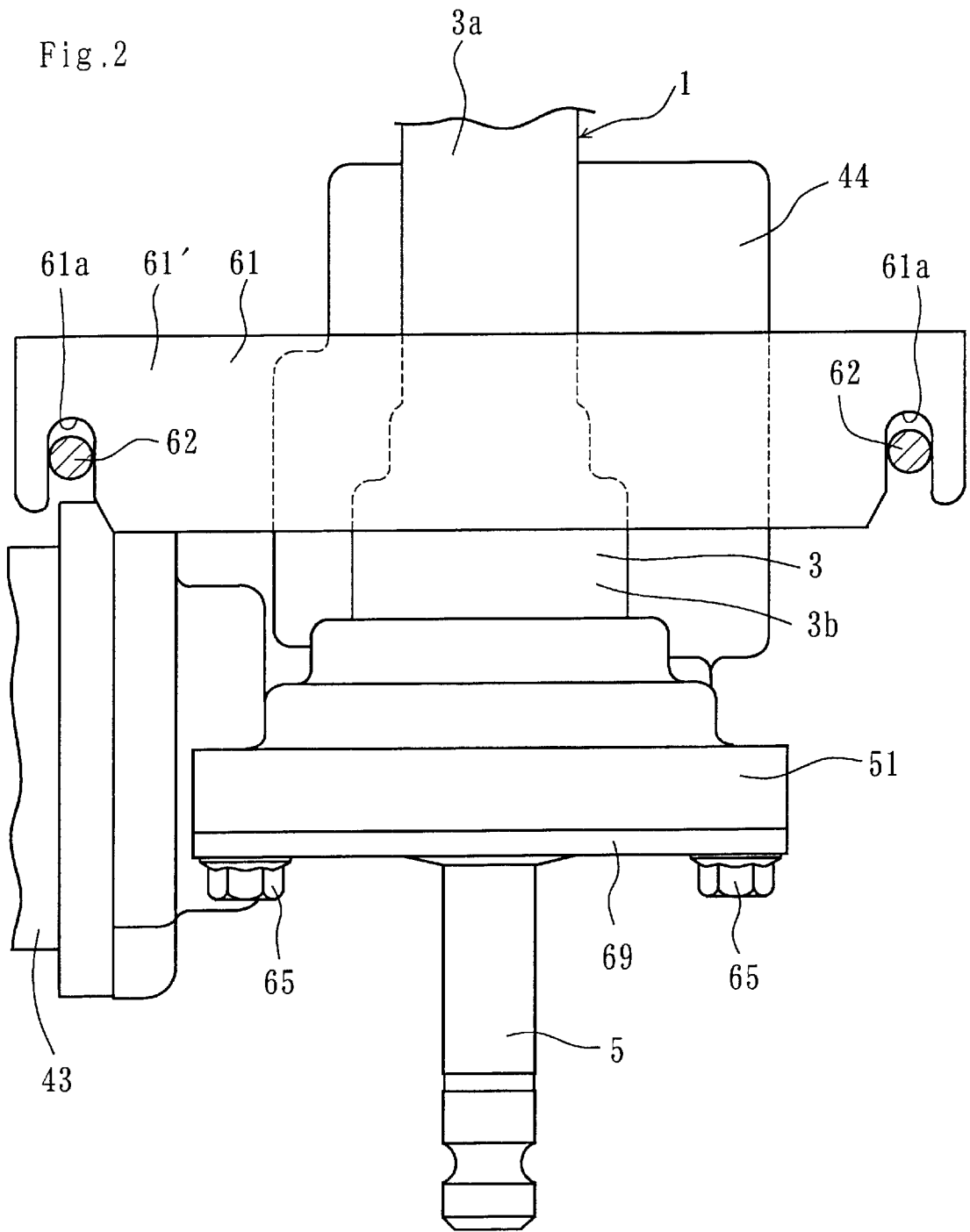
FIG. 2 is a plan view of the essential elements of the electric power steering device according to the first embodiment of the present invention.

As shown in FIGS. 1 and 2, a worm wheel (driven gear) 41 is provided on the outer circumference of the third shaft 5c so as to rotate together, and a worm (driving gear) 42 which engages with the worm wheel 41 is provided on the output shaft of an electric motor (actuator) 43 for generating steering assistance power. Above-mentioned torque sensor 20 is disposed between the worm wheel 41 and the steering wheel 15. The motor 43 and the torque sensor 20 are connected to a controller 44. The controller 44 controls the motor 43 in response to the torque detected by the torque sensor 20. By transmitting the rotation of the motor 43 to the steering shaft 5 by means of a reduction gear mechanism having the worm 42 and worm wheel 41, steering assistance power can be provided in response to the torque detected.

The housing 3, which includes the tubular portion 3a covering the steering shaft 5 between the steering wheel 15 and torque sensor 20 and the portion 3b covering the torque sensor 20, is formed by plastically deforming a single steel pipe. The inner diameter of the housing 3 at one end, which is further away than the other end from the steering wheel 15, is larger than at the other end. The housing 3 is formed by enlarging the diameter of the steel pipe. Furthermore, the inner circumferential portions of the housing 3, which support the steering shaft 5 via the bearings 8 and 9, are machined after plastic deformation in order to ensure that the bearings 8 and 9 are precisely fitted in the inner circumferential portion.

Figure 3:
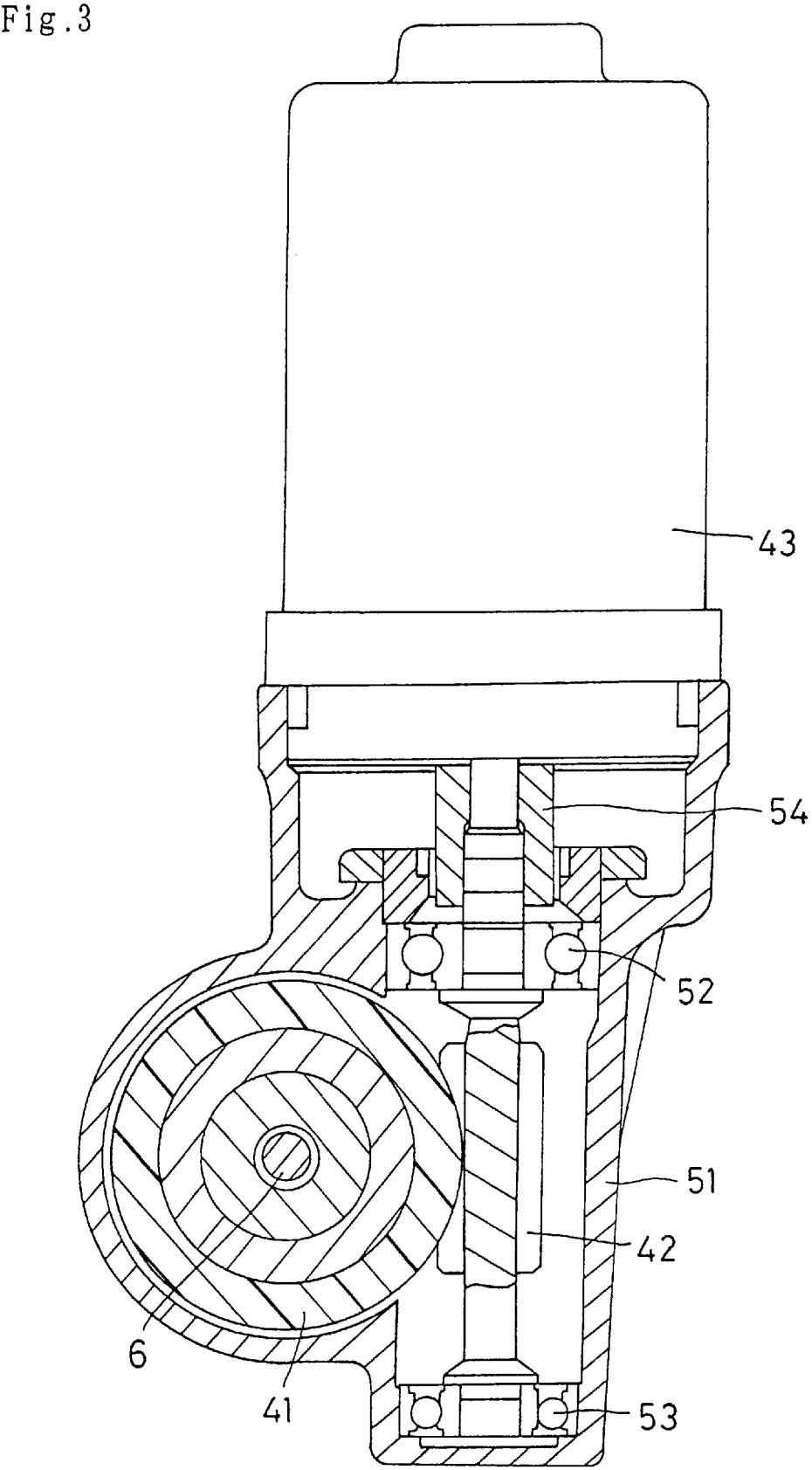
FIG. 3 is a partial cross-sectional view of the essential elements of the electric power steering device according to the first embodiment of the present invention.

As shown in FIGS. 1 and 3, a gear housing 51 covers the worm wheel 41 and worm 42. In the present embodiment, the gear housing 51 is made from cast aluminum. The gear housing 51 is integrated with one end of the housing 3, the one end of which is further away than the other end from the steering wheel 15, by pouring aluminum into the die cast mold in which the housing 3 is inserted. In addition, different materials and different methods of formation may be adopted to form the gear housing 51, and the gear housing 51 may be integrated with the housing 3 by means of bolts or the like. The worm 42 is supported via bearings 52 and 53 by means of the gear housing 51. The motor 43 is attached to the gear housing 51, and the worm 42 is connected to the output shaft of the motor 43 via a coupling 54. In the present embodiment, the gear housing 51 is integrally cast with a portion 44a of casing of the controller 44, a remaining portion 44b of the casing is attached to the portion 44a by means of bolts or the like, and a control circuit that primarily makes up the controller 44 is stored in the casing.

An end cover 69 covers a portion of the steering shaft 5, the portion of which is further away than the worm wheel 41 from the steering wheel 15. In the present embodiment, the end cover 69 is made from cast aluminum. The bearings 8 and 9 for supporting the steering shaft 5 by means of the housing 3, the steering shaft 5 united with the worm wheel 41, and the torque sensor 20 are inserted into the gear housing 51 and housing 3 from one end of the gear housing 51 and housing 3, the one end of which is further away than the other end from the steering wheel 15. After inserting these parts, the end cover 69 is fitted to the steering shaft 5 via the bearing 10. Next, a nut 55 is screwed onto the outer circumference of the steering shaft 5 in order to prevent the end cover 69 and bearings 10 from falling out of the steering shaft 5. After it is secured, the end cover 69 is integrated with one end of the gear housing 51, the one end of which is further away than the other end from the steering wheel 15, by means of bolts 65. Thus, the end cover 69 covers one end of the gear housing 51, the one end of which is further away than the other end from the steering wheel 15. In addition, different materials and different methods of formation may be adopted for the end cover 69 than that shown in the present embodiment.

As shown in FIGS. 1 and 2, a steel lower bracket (connecting member) 61 is welded to the housing 3. The lower bracket 61 is formed from a plate-shape material, and includes a plate portion 61' which extends parallel to the plane containing the center axis of the steering shaft 5. Screw shafts 62 anchored in the vehicle body are passed through notches 61a formed in the plate portion 61', and the lower bracket 61 is connected to the vehicle body by being clamped between nuts (not shown in the figures) screwed on to the screw shafts 62 and the vehicle body.

Figure 4:
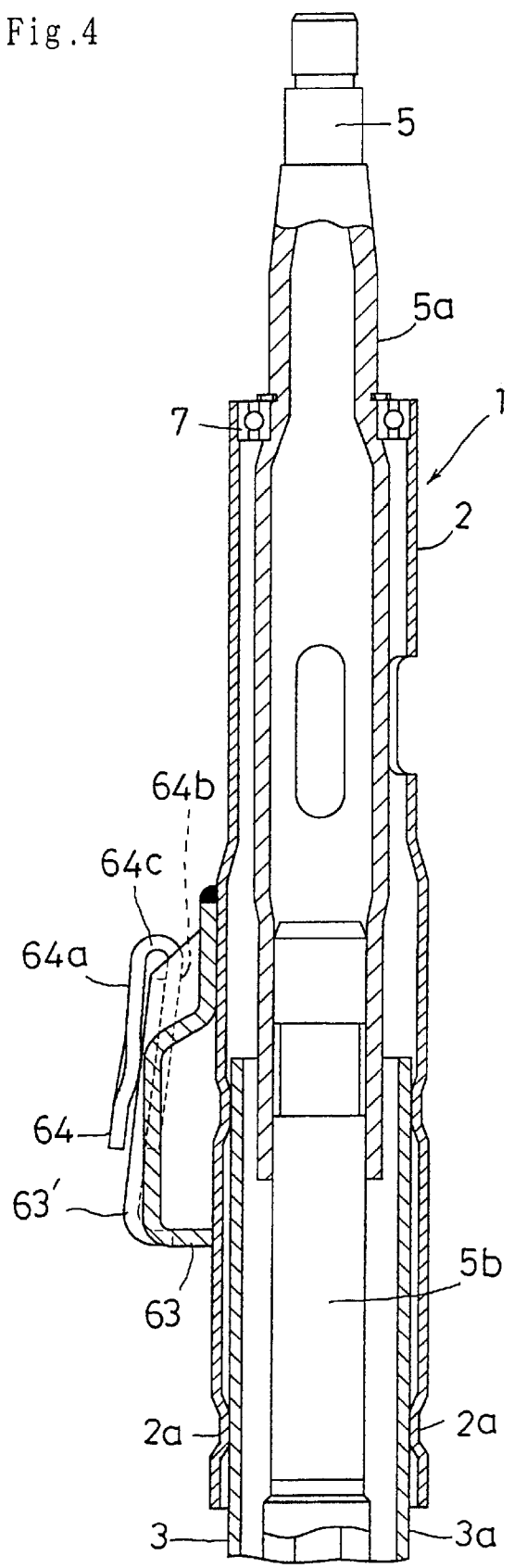
FIG. 4 is a partial vertical cross-sectional view of the essential elements of the electric power steering device according to the first embodiment of the present invention.
Figure 5:
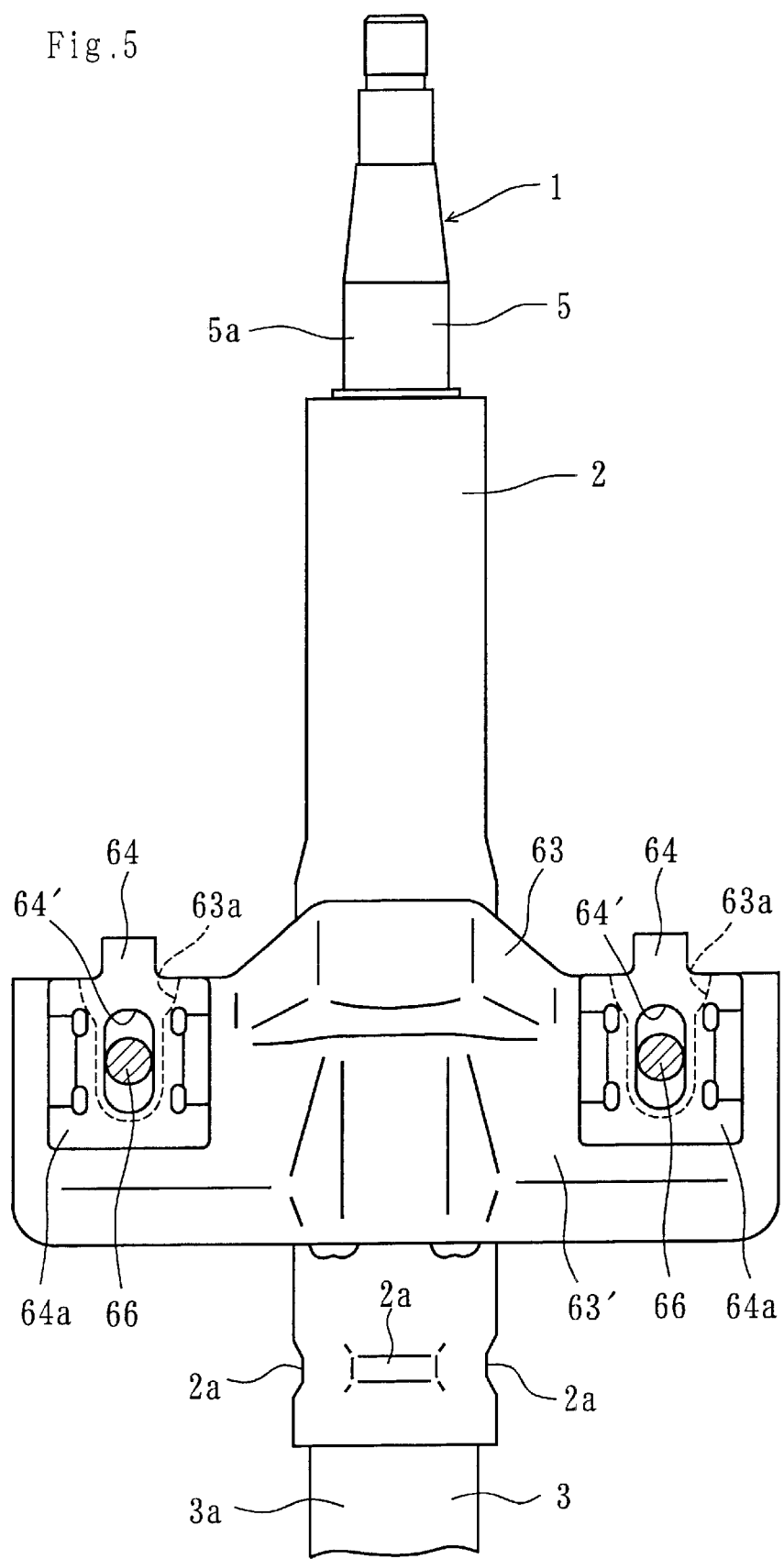
FIG. 5 is a partial plan view of the essential elements of the electric power steering device according to the first embodiment of the present invention.

As shown in FIGS. 4 and 5, the column 2 is attached to the vehicle body via a steel upper bracket 63. The upper bracket 63 is formed from a plate-shape material, and is integrated with the column 2 by welding. The upper bracket 63 includes a plate portion 63', which is slightly inclined with respect to a plane parallel to the plane containing the center axis of the steering shaft 5. A pair of notches 63a are formed in the plate portion 63' so as to be open on the side facing the steering wheel 15. A pair of approximately U shaped (when viewed laterally) retaining members 64 are attached on the plate portion 63' of the upper bracket 63. Each retaining member 64 is formed from a metal plate. Each retaining member 64 includes a pair of clamping portions 64a and 64b which oppose to each other across a space, and a connecting portion 64c which connects the clamping portions 64a and 64b with each other on the side facing the steering wheel 15. The plate portion 63' of the upper bracket 63 is partially inserted between the clamping portions 64a and 64b of the retaining members 64 on the side facing the steering wheel 15. Each notch 63a is positioned such that it faces the connecting portion 64c. A through hole 64' which opposes notch 63a is formed in each of the clamping portions 64a and 64b of the retaining member 64. Screw shafts 66, which are anchored in the vehicle body, are passed through each notch 63a and each through hole 64'. Each retaining member 64 is fixed to the vehicle body by being clamped between nuts (not shown in the figures) screwed onto the screw shafts 66 and the vehicle body. Furthermore, by clamping each retaining member 64 between the nuts and vehicle body, the upper bracket 63 is clamped between the clamping portions 64a and 64b of each retaining member 64. Thus, when an impact is applied due to a collision between the driver and the steering wheel 15, the upper bracket 63 and column 2 are displaced with respect to the vehicle body, to which the retaining member 64 is fixed, against friction between the upper bracket 63 and the clamping portions 64a, 64b of the retaining members 64.

In the above-mentioned embodiment, when the vehicle collides with an obstacle in front of the vehicle and the driver collides with the steering wheel 15, the upper bracket 63 is relatively displaced with respect to the retaining member 64 by an impact, and the column 2 is relatively displaced with respect to the tubular portion 3a, so that the energy of impact is absorbed due to friction between these relatively displaced members.

According to the above-mentioned embodiment, because the housing 3, which is formed by plastically deforming a single steel pipe, covers not only the steering shaft 5 but also the torque sensor 20, the number of parts can be reduced, the manufacturing process can be simplified because it is unnecessary to press fit a column into a sensor housing as with the prior art, the size of the steering device can be reduced and space can be saved because the walls of the housing 3 do not have to be thickened for press fitting. Furthermore, because the dimensional tolerances of the housing 3 formed by plastically deforming a single steel pipe are smaller than of a housing formed from cast, the need for post-machining after plastic deformation can be reduced to only the areas in which the bearings 8 and 9 are fit.

Moreover, the bearings 8 and 9, worm wheel 41, steering shaft 5 and torque sensor 20 can be assembled in the housing 3 from one end of the housing 3, the one end of which is further away than the other end from the steering wheel 15. In other words, because the assembling steps can be performed from one side of the housing 3, working efficiency can be increased.

Because the steel lower bracket 61 for connecting the housing 3 to the vehicle body is welded to the housing 3, it is unnecessary to use bolts and the like to fix the lower bracket 61 to the housing 3, the number of parts can be reduced, and the manufacturing process can be simplified.

Figure 7:
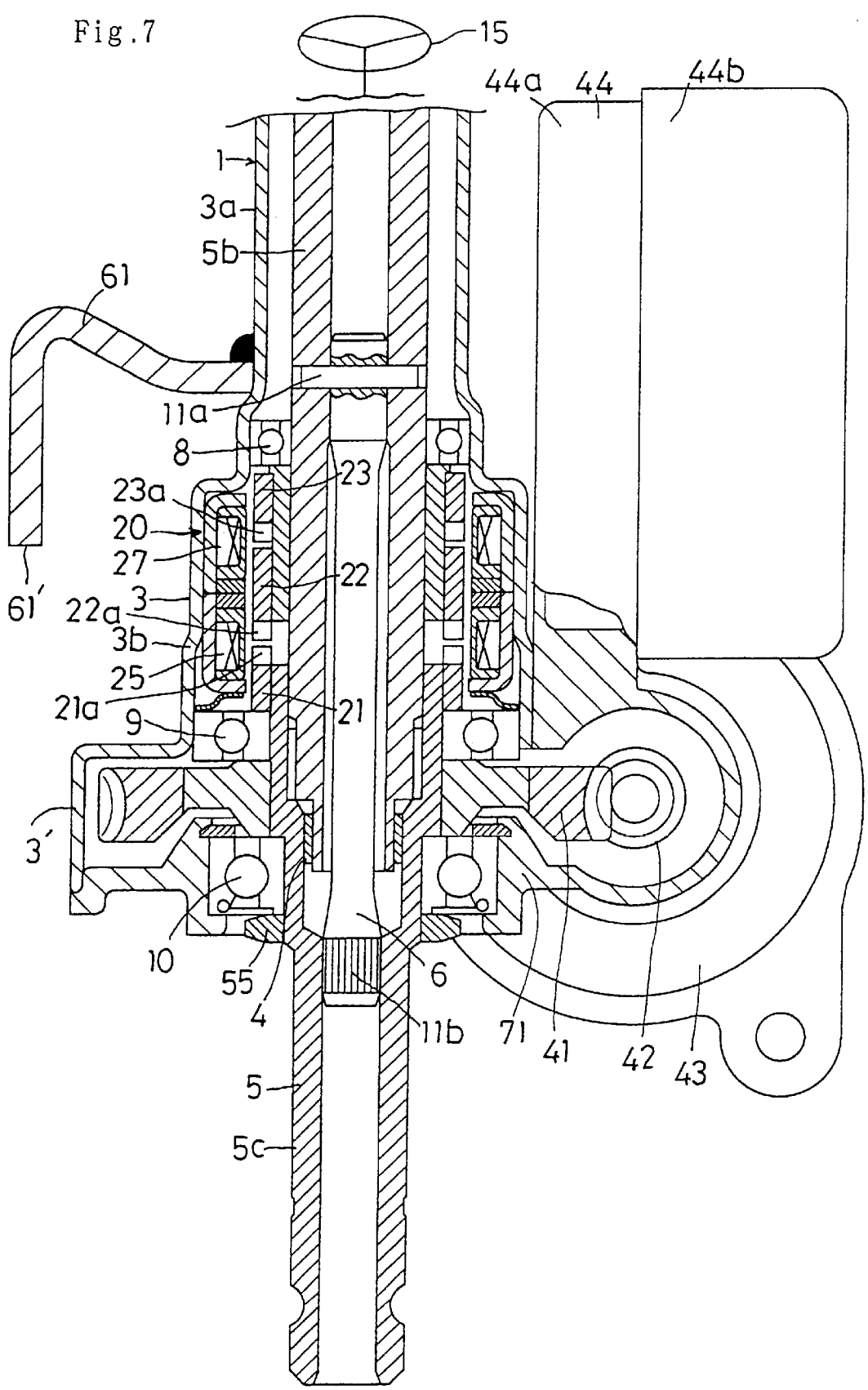
FIG. 7 is a vertical cross-sectional view of the essential elements of an electric power steering device according to a second embodiment of the present invention.
Figure 8:
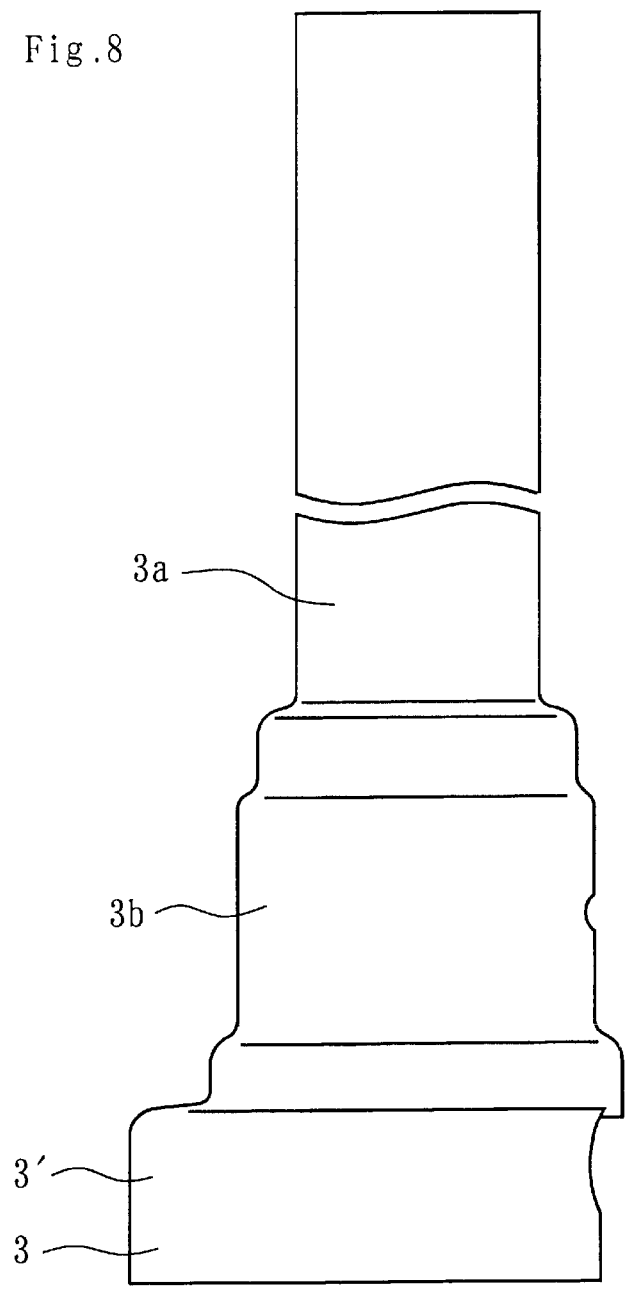
FIG. 8 is a side view of a housing and a second housing of the electric power steering device according to the second embodiment of the present invention.
Figure 8:
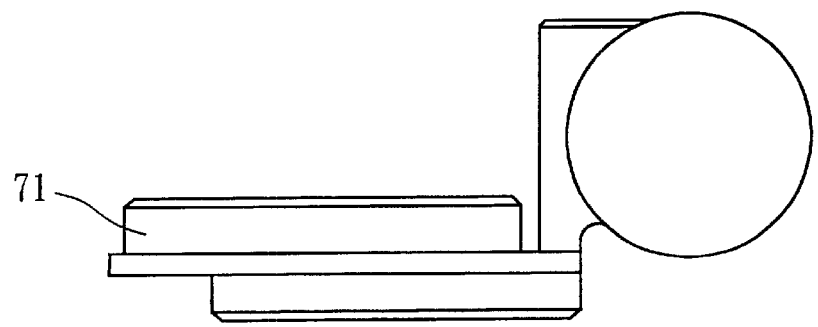

A second embodiment of the present invention is shown in FIGS. 7 and 8. It differs from the above-mentioned first embodiment in that, in place of the gear housing 51 and the end cover 69, a gear covering portion 3', which covers the worm wheel 41, is provided in the housing 3, and also a second housing 71 is provided so that it covers the worm 42 and a portion of the steering shaft 5, the portion of which is further away than the worm wheel 41 from the steering wheel 15. In the present embodiment, the second housing 71 is made of cast aluminum. The second housing 71 is integrated with the housing 3 by being press fitted into one end of the housing 3, the one end of which is further away than the other end from the steering wheel 15. In addition, different materials may be used, and different methods of formation may be applied for the second housing 71. The worm 42 is supported by the second housing 71 in the same manner as that in the first embodiment. The motor 43 is attached to the second housing 71. The second housing 71 is cast integrally with the portion 44a of the controller 44. According to the second embodiment, because the housing 3 and second housing 71 perform the same functions as the housing 3, gear housing 51, and end cover 69 of the first embodiment, the number of parts can be further reduced, and the manufacturing process can be simplified. Other than those above, the same reference numerals used in the second embodiment refer to the same parts as used in the first embodiment.

The present invention is not limited to the above-mentioned embodiments. For example, the present invention can be applied to an electric power steering device which does not include a shock absorbing mechanism. Furthermore, the column 2 and housing 3 may be formed integrally with each other. Moreover, the housing may be formed from a pipe of a metal other than steel, and the lower bracket may be formed from a metal other than steel. The amount of the steering assistance power generated by the electric actuator may be determined according to not only the torque detected by the torque sensor but also the vehicle speed, operation angle of the steering angle, and the like.

What is claimed is:

1. An electric power steering device comprising:
    a steering shaft which rotates by operation of a steering wheel;
    a torque sensor which detects torque transmitted by the steering shaft;
    an electric actuator for generating steering assistance power, which is driven in response to the torque detected;
    a reduction gear mechanism which transmits the rotation of the actuator to said steering shaft;
    the reduction gear mechanism having a driven gear provided on the steering shaft and a driving gear which engages with the driven gear;
    said torque sensor being disposed between said steering wheel and said driven gear;
    a housing having a portion which covers said steering shaft between said steering wheel and said torque sensor, and a portion which covers the torque sensor,
    the housing being formed by plastically deforming a single metal pipe;
    a gear housing which covers said driving gear and said driven gear,
    the gear housing being integrated with one end of said housing, the one end of which is further away than the other end from the steering wheel; and
    an end cover which covers a portion of said steering shaft, the portion of which is further away than said driven gear from the steering wheel,
    the end cover being integrated with one end of said gear housing, the one end of which is further away than the other end from the steering wheel.

2. The electric power steering device according to claim 1, wherein
    the inner diameter of said housing at one end, which is further away than the other end from the steering wheel, is larger than at the other end;
    said steering shaft is supported by said housing via bearings; and
    said bearings, said steering shaft united with said driven gear, and said torque sensor are inserted into the housing from one end thereof, which is further away than the other end from the steering wheel.

3. The electric power steering device according to claim 1, wherein
    the inner diameter of said housing at one end, which is further away than the other end from the steering wheel, is larger than at the other end;
    said steering shaft is supported by said housing via bearings; and
    said bearings, said steering shaft united with said driven gear, and said torque sensor are inserted into the housing from one end thereof, which is further away than the other end from the steering wheel.

4. The electric power steering device according to claim 1, further comprising a metal connecting member which is connected to a vehicle body and is welded to said housing.

5. The electric power steering device according to claim 1, further comprising a metal connecting member which is connected to a vehicle body and is welded to said housing.

6. The electric power steering device according to claim 3, further comprising a metal connecting member which is connected to a vehicle body and is welded to said housing.

7. An electric power steering device comprising:
    a steering shaft which rotates by operation of a steering wheel;
    a torque sensor which detects torque transmitted by the steering shaft;

an electric actuator for generating steering assistance power, which is driven in response to the torque detected;

a reduction gear mechanism which transmits the rotation of the actuator to said steering shaft;

the reduction gear mechanism having a driven gear provided on the steering shaft and a driving gear which engages with the driven gear;

said torque sensor being disposed between said steering wheel and said driven gear;

a housing having a portion which covers said steering shaft between said steering wheel and said torque sensor, and a portion which covers the torque sensor, the housing being formed by plastically deforming a single metal pipe, the inner diameter of said housing at one end, which is further away than the other end from the steering wheel, being larger than at the other end, said steering shaft being supported by said housing via bearings, and said bearings, said steering shaft united with said driven gear, and said torque sensor being inserted into the housing from one end thereof, which is further away than the other end from the steering wheel.

8. The electric power steering device according to claim 7, further comprising a metal connecting member which is connected to a vehicle body and is welded to said housing.

9. An electric power steering device comprising:

a steering shaft which rotates by operation of a steering wheel;

a torque sensor which detects torque transmitted by the steering shaft;

an electric actuator for generating steering assistance power, which is driven in response to the torque detected;

a reduction gear mechanism which transmits the rotation of the actuator to said steering shaft;

the reduction gear mechanism having a driven gear provided on the steering shaft and a driving gear which engages with the driven gear;

said torque sensor being disposed between said steering wheel and said driven gear;

a housing having a portion which covers said steering shaft between said steering wheel and said torque sensor, and a portion which covers the torque sensor, the housing being formed by plastically deforming a single metal pipe; and a metal connecting member which is connected to a vehicle body and is welded to said housing.

* * * * *